L. W. SHEPARD.
FERTILIZER DISTRIBUTER ATTACHMENT FOR SEED-DRILLS.

No. 180,945. Patented Aug. 8, 1876.

UNITED STATES PATENT OFFICE

LYMAN W. SHEPARD, OF ARCOLA, VIRGINIA.

IMPROVEMENT IN FERTILIZER-DISTRIBUTER ATTACHMENTS FOR SEED-DRILLS.

Specification forming part of Letters Patent No. 180,945, dated August 8, 1876; application filed June 8, 1876.

*To all whom it may concern:*

Be it known that I, LYMAN W. SHEPARD, of Arcola, in the county of Loudoun and State of Virginia, have invented a new and Improved Fertilizer-Distributer Attachment to Seed-Drills; and I do hereby declare that the following is a full, clear, and exact description of the same.

The invention relates to an improvement in the class of fertilizer-distributers in which the material is fed through openings in the bottom of the hopper by means of auger-shaped or spiral-twist shafts.

The improvement consists in the application of radial or curved arms to the feed-shafts, for the purpose of stirring or agitating the fertilizer, and drawing it toward the feeders, as hereinafter described.

Figure 1:
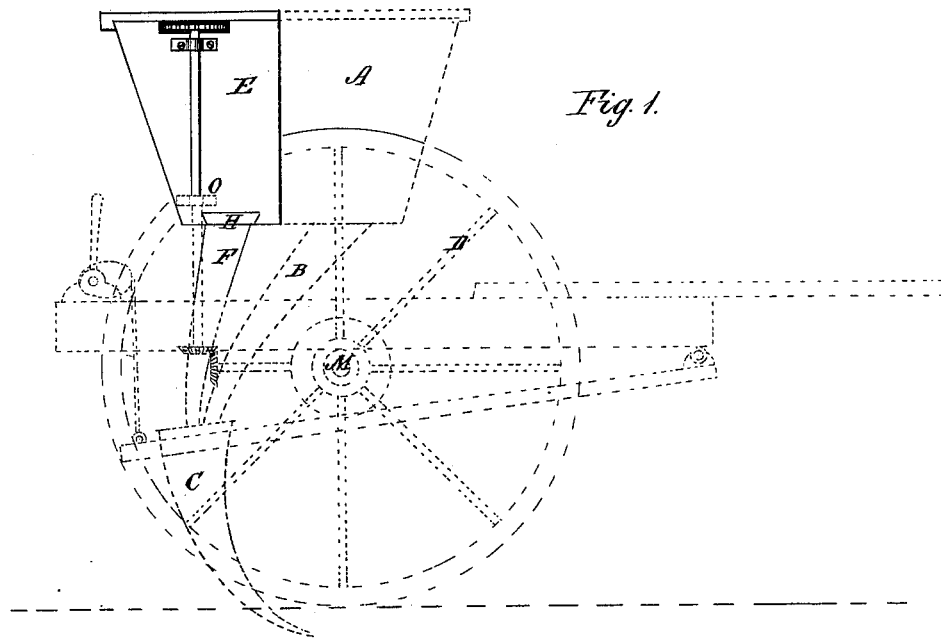
Figure 2:
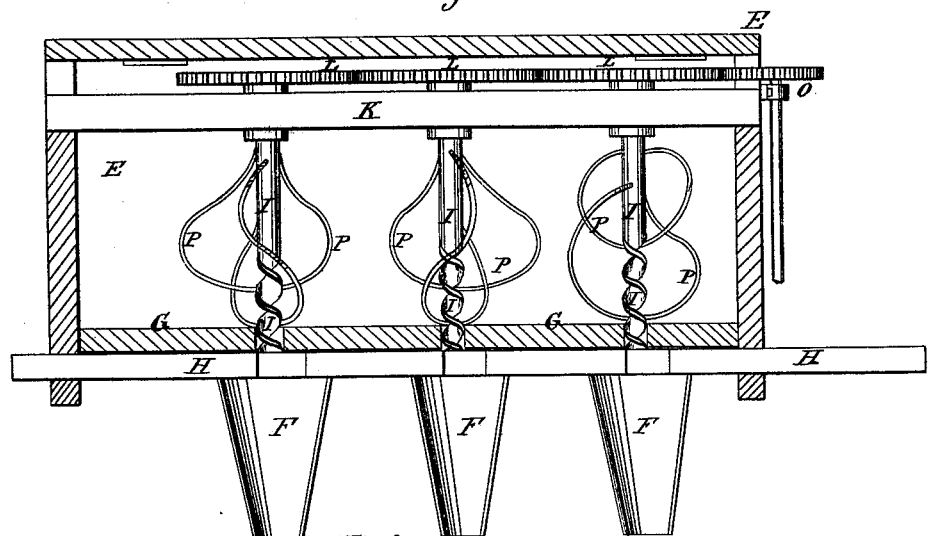
Figure 3:
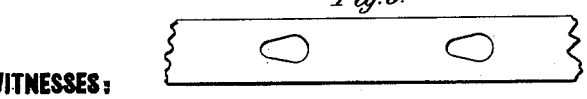

In the accompanying drawing, forming part of this specification, Figure 1 is a side elevation of a grain-drill (shown in dotted lines) with my improvement attached. Fig. 2 is a vertical longitudinal section of the fertilizer-distributer.

A represents the hopper, B the spouts or conducting-tubes, C the drill teeth, and D the transporting-wheels, of a well-known form of seeding-machine. The hopper E for containing the fertilizing material—such as guano or bone-dust—is shown attached immediately in rear of the grain-hopper A, and provided with conducting-tubes F, which are connected with the seed-tubes B, so that the seed and fertilizer are distributed together in the drills made by the teeth C. The bottom G of the hopper E has a series of holes, which may be diminished in area and capacity by means of a slide, H, having a corresponding number of holes. The feeding devices proper are the auger-shafts I, which stand vertical in the hopper, with their lower ends in the openings in the bottom plate thereof, and their upper ends extending through a cross-bar, K, and provided with spur-gears L. Said gears mesh and are connected with the axle M by means of suitable gearing O, so that the shafts I are rotated whenever the machine advances, and thus caused to feed the fertilizer downward into the spouts or tubes F. The means for stirring or agitating the fertilizer and breaking up the lumps, &c., consist of arms P, which are rigidly attached to, and form one device with, the shafts I. These arms have, or may have, various forms. For instance, they may be curved, and extended outward horizontally from the shaft, or extended downward and join or attach to the shaft at each end, and they may be straight or radial to the shaft; but I prefer to give them a spiral form, in order that they may the better draw the fertilizer inward toward and around the feed-shafts, and thus render material aid in discharging it from the hopper. This spiral shape is practically of most importance when but a small quantity of fertilizer remains in the hopper, for it is obvious the operation of gravity will not, in such case, cause the fertilizer to press around the shafts, and thus assist in producing an equable discharge.

The discharge of the fertilizing material may be regulated by adjusting the slide H, to increase or diminish the size of the openings for the auger-shaft, the openings in the slide being triangular or egg-shaped for that purpose. Another method of regulating the discharge is by varying the rapidity of rotation of the gears L, and thereby also of the feed-shaft.

Without, therefore, restricting myself to the particular form of the arms of the feed-shafts, I claim—

In a fertilizer distributer for seed-drills, the vertical auger-shafts provided with arms P, substantially as shown and described, for agitating and feeding the fertilizer through the openings in the bottom of the hopper, as set forth.

The above specification of my invention signed by me this 5th day of June, 1876.

LYMAN W. SHEPARD.

Witnesses:
SOLON C. KEMON,
CHAS. A. PETTIT.